Patented Sept. 6, 1938

2,129,294

UNITED STATES PATENT OFFICE 2,129,294

2-AMINO-6-PIPERIDYL-PYRIDINES

Johan Pieter Wibaut, Amsterdam, and Herman Johannes den Hertog, Jr., Deventer, Netherlands, assignors to The Dow Chemical Company, Midland, Mich., a corporation of Michigan No Drawing. Application November 5, 1936, Serial No. 109,348

3 Claims. (Cl. 260—293)

This invention concerns certain new pyridine derivatives, viz., 2-amino-6-piperidyl-pyridines having the general formula:

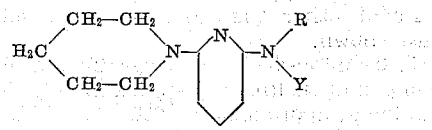

wherein R represents hydrogen or an alkyl group and Y represents hydrogen or an alkyl or acyl group. The pyridine derivatives having the formula just stated may be employed directly as insecticides and are particularly useful as intermediate products from which a variety of other pyridine derivatives useful as medicinals, germicides, insecticides, etc., may be prepared.

In U. S. Patent No. 1,977,662, issued October 23, 1934, we have disclosed a method whereby a 2.6-dihalo-pyridine may economically be manufactured.

Our 2-amino-6-piperidyl-pyridines are prepared by reacting a 2.6-dihalo-pyridine with ammonia or a primary or secondary alkyl amine to form the corresponding 2-amino-6-halo-pyridine, and thereafter reacting the latter with piperidine in the presence of pyridine to form the 2-amino-6-piperidyl-pyridine product. If desired, the order in which these two reactions are carried out may be reversed, i. e. the 2.6-dihalo-pyridine may be reacted with piperidine to form a 2-halo-6-piperidyl-pyridine, and the latter may then be reacted with ammonia or a primary or secondary alkyl amine to form the desired 2-amino-6-piperidyl-pyridine product.

The reaction for the formation of a 2-amino-6-halo-pyridine is carried out by heating a 2.6-dihalo-pyridine, e. g., 2.6-dibromo- or 2.6-dichloro-pyridine, with at least its molecular equivalent of ammonia or a primary or secondary amine, in aqueous or alcoholic solution, to a reaction temperature above 170° C., e. g., between 180° and 225° C. in a bomb or autoclave. A catalyst such as cuprous oxide, cuprous chloride, cupric chloride, copper sulphate, or other copper compound may advantageously be present as a reaction promoter, but the reaction can be carried out smoothly in the absence of such catalyst. Among the various alkyl amines which may be employed in the reaction are methyl amine, ethyl amine, butyl amine, diethyl amine, dipropyl amine, diethanol amine, etc. During the reaction, samples of the mixture may be withdrawn from time to time and analyzed for inorganic halides to determine the extent of reaction. When approximately one chemical equivalent of inorganic halide has been formed by the reaction per mole of 2.6-dihalo-benzene employed, the reactor is cooled, the charge removed, and the 2-amino-6-halo-pyridine intermediate product is separated by usual procedure, e. g., filtration or distillation. The amino group in said intermediate product will, of course, be a primary, secondary, or tertiary amino group, depending upon whether ammonia or a primary or secondary alkyl amine is employed in the reaction.

The 2-amino-6-halo-pyridine intermediate product is heated with at least its molecular equivalent of each of the compounds piperidine and pyridine in a bomb or autoclave at temperatures above 170 C., preferably between 180° and 250° C. The reaction is usually complete after between 5 and 10 hours of heating under the conditions just stated, but longer heating may sometimes be required. The reactor is then cooled, the charge removed, and the product is separated by steam-distilling other organic materials therefrom.

The following example illustrates one way in which the principle of the invention may be applied, but is not to be construed as limiting the invention:

A mixture of 4.0 grams of 2.6-dibromo-pyridine and 120 cubic centimeters of approximately 25 per cent concentrated aqueous ammonia solution was heated in a bomb to temperatures between 180° and 190° C. for five hours, after which the bomb was cooled and the charge removed. A mixture of liquid and crystalline materials was obtained. The crystalline material was separated by filtration, after which unreacted 2.6-dibromo-pyridine was steam-distilled therefrom. The liquor remaining after this steam-distillation was cooled to crystallize the 2-amino-6-bromo-pyridine product, which was separated and recrystallized from ethyl alcohol. There was obtained 16 grams of 2-amino-6-bromo-pyridine. A mixture of 6 grams of the 2-amino-6-bromo-pyridine, 4.5 grams of piperidine, and 10 grams of pyridine was heated in a bomb to approximately 180° C. for 8 hours, after which the bomb was cooled and the charge removed. The reacted mixture was then steam-distilled to separate therefrom pyridine, and any unreacted piperidine and 2-amino-6-bromo-pyridine. The mixture remaining after the steam-distillation was cooled and extracted with ether to separate the 2-amino-6-piperidyl-pyridine product therefrom. The ether extract was then evaporated and the residual product was purified by distilling the same under vacuum.

The 2-amino-6-piperidyl-pyridine product was obtained in the form of colorless needles, melting at approximately 38°–39° C. The product boils at approximately 202° C. under 30 millimeters pressure and has the formula:

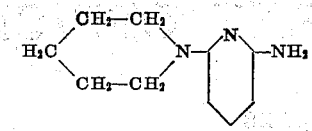

The 2-amino-6-piperidyl-pyridine product forms a mono-picrate melting at approximately 161° C.

Other 2-amino-6-piperidyl-pyridines may be prepared by procedure similar to that described above. For example, 2-ethyl-amino-6-piperidyl-pyridine may be prepared by reacting 2.6-dichloro-pyridine successively with ethylamine and piperidine; 2-dimethyl-amino-6-piperidyl-pyridine may be prepared by reacting 2.6-dibromo-pyridine successively with dimethylamine and piperidine; 2-diethanolamine-6-piperidyl-pyridine may be made by reacting 2.6-dibromo-pyridine successively with diethanolamine and piperidine, etc. All of the 2-amino-6-piperidyl-pyridine products possess germicidal properties and are toxic toward insects. They may, accordingly, be employed in antiseptic and insecticidal compositions.

Other modes of applying the principle of the invention may be employed instead of those explained, change being made as regards the compounds herein disclosed, provided the compound or compounds stated by any of the following claims or the equivalent of such stated compound or compounds be employed.

We therefore particularly point out and distinctly claim as our invention:—

1. A 2-amino-6-piperidyl-pyridine having the general formula:

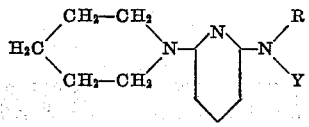

wherein R is a substituent of the group consisting of hydrogen and alkyl radicals and Y is a substituent of the group consisting of hydrogen and alkyl and acyl radicals and wherein the pyridine nucleus contains no substituent other than the 2- and 6-substituents just shown.

2. A 2-amino-6-piperidyl-pyridine having the general formula:

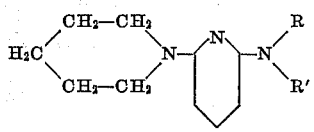

wherein R and R' are substituents of the group consisting of hydrogen and alkyl radicals and wherein the pyridine nucleus contains no substituent other than the 2- and 6-substituents just shown.

3. 2-amino-6-piperidyl-pyridine, a crystalline compound melting at approximately 38°–39° C., boiling at approximately 202° C. at 30 millimeters pressure and having the formula:

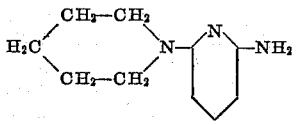

JOHAN PIETER WIBAUT.
HERMAN JOHANNES DEN HERTOG, JR.